United States Patent [19]

Tsuchiya

[11] Patent Number: 5,471,952
[45] Date of Patent: Dec. 5, 1995

[54] ILLUMINATOR FOR AQUARIUM TANK

[75] Inventor: Toshihiro Tsuchiya, Kashiwa, Japan

[73] Assignee: Nisso Industry Co., Ltd., Tokyo, Japan

[21] Appl. No.: 216,420

[22] Filed: Mar. 23, 1994

[30] Foreign Application Priority Data

Mar. 23, 1993 [JP] Japan ................. 5-018900 U

[51] Int. Cl.⁶ ............................................. A01K 63/06
[52] U.S. Cl. ..................................... 119/267; 119/266
[58] Field of Search .......................... 119/265, 266, 119/269, 267; 362/223, 224, 374, 375

[56] References Cited

U.S. PATENT DOCUMENTS

| 3,479,701 | 11/1969 | Zerfoss | 362/374 |
| 3,622,717 | 11/1971 | Bovio | 119/266 |
| 4,315,302 | 2/1982 | Petralia | 362/223 |
| 5,172,976 | 12/1992 | Bogdanovs | 362/223 |

FOREIGN PATENT DOCUMENTS

| 256988 | 9/1967 | Austria | 362/374 |
| 1980290 | 9/1967 | Germany | |
| 2731363 | 1/1979 | Germany | 119/266 |
| 411130 | 11/1966 | Switzerland | 362/374 |
| 930934 | 7/1963 | United Kingdom | |
| 1395144 | 5/1975 | United Kingdom | 362/374 |
| 2226940 | 7/1990 | United Kingdom | 119/266 |
| 2239402 | 7/1991 | United Kingdom | |

*Primary Examiner*—Todd E. Manahan
*Attorney, Agent, or Firm*—Oblon, Spivak, McClelland, Maier, & Neustadt

[57] ABSTRACT

An illuminator for an aquarium tank including a tank body and a lid member mounted on the tank body is accommodated in the lid member. The illuminator includes a base plate, a light source attached to the base plate, a translucent cover for covering the light source and protecting it from waterdrops. The cover is provided with a plurality of fastened members and a plurality of resilient fastening members are provided on the base plate for detachably engaging the fastened members.

1 Claim, 5 Drawing Sheets

ILLUMINATOR FOR AQUARIUM TANK

BACKGROUND OF THE INVENTION

1. Field of the Invention

The present invention relates to an illuminator for an aquarium tank for raising tropical fish etc. and includes a tank body and a lid member mounted on the tank body.

2. Description of the Prior Art

An aquarium tank having a good appearance and including a filter device, an illuminator, etc. which are easy to mount is disclosed in U. K. Patent No. 2,239,402, for example. The prior art aquarium tank comprises a tank body and a lid member mounted on the tank body. The tank body comprises a main frame made of synthetic resin or the like and open on the front, portions of the opposite sides and top, and a transparent frame made of glass, synthetic resin or the like, having a U-shaped sectional profile and mounted in the main frame so that the open front and side portions of the main frame are closed in a watertight fashion. The lid member is made of synthetic resin in the form of a shallow dish, has an openable and closable front lid for use in feeding tropical fish etc. and a rear casing in which an illuminator etc. are stored, and is provided on the back surface thereof with a receptacle for a heater etc. The illuminator for the prior art aquarium tank is provided with a transparent cover in order to protect the light source (fluorescent lamps) from waterdrops. Since the transparent cover is fastened with screws to the illuminator framework, the tasks of wiping up adhering waterdrops from and cleaning the transparent cover have been carried out, with the transparent cover left as it is. These tasks are, however, very troublesome. When the fluorescent lamps have to be cleaned or replaced, for example, it is necessary to loosen the screws and detach the transparent cover from the illuminator framework. Thus, the prior art illuminator poses a serious problem of workability.

The present invention has been proposed to solve the problems mentioned above and has as its main object to provide an illuminator for an aquarium tank enabling ready attachment and detachment of a light source protecting cover.

SUMMARY OF THE INVENTION

To attain the above object, according to the present invention there is provided an illuminator for an aquarium tank comprising a tank body and a lid member mounted on the tank body for accommodating the illuminator therein, the illuminator comprising a base plate, a light source attached to the base plate, a translucent cover for covering the light source and protecting it from waterdrops and provided with a plurality of fastened members, and a plurality of resilient fastening members provided on the base plate for detachably engaging the fastened members.

With this arrangement, the resilient fastening members can be resiliently engaged with and readily disengaged from the fastened members and the engagement and disengagement therebetween enables ready attachment and detachment of the translucent cover to and from the base plate of the illuminator.

The above and other objects, features and advantages of the present invention will become more apparent to those skilled in the art from the description given hereinbelow with reference to the accompanying drawings.

DESCRIPTION OF THE PREFERRED EMBODIMENT

The present invention will now be described with reference to the illustrated embodiment.

Figure 1:
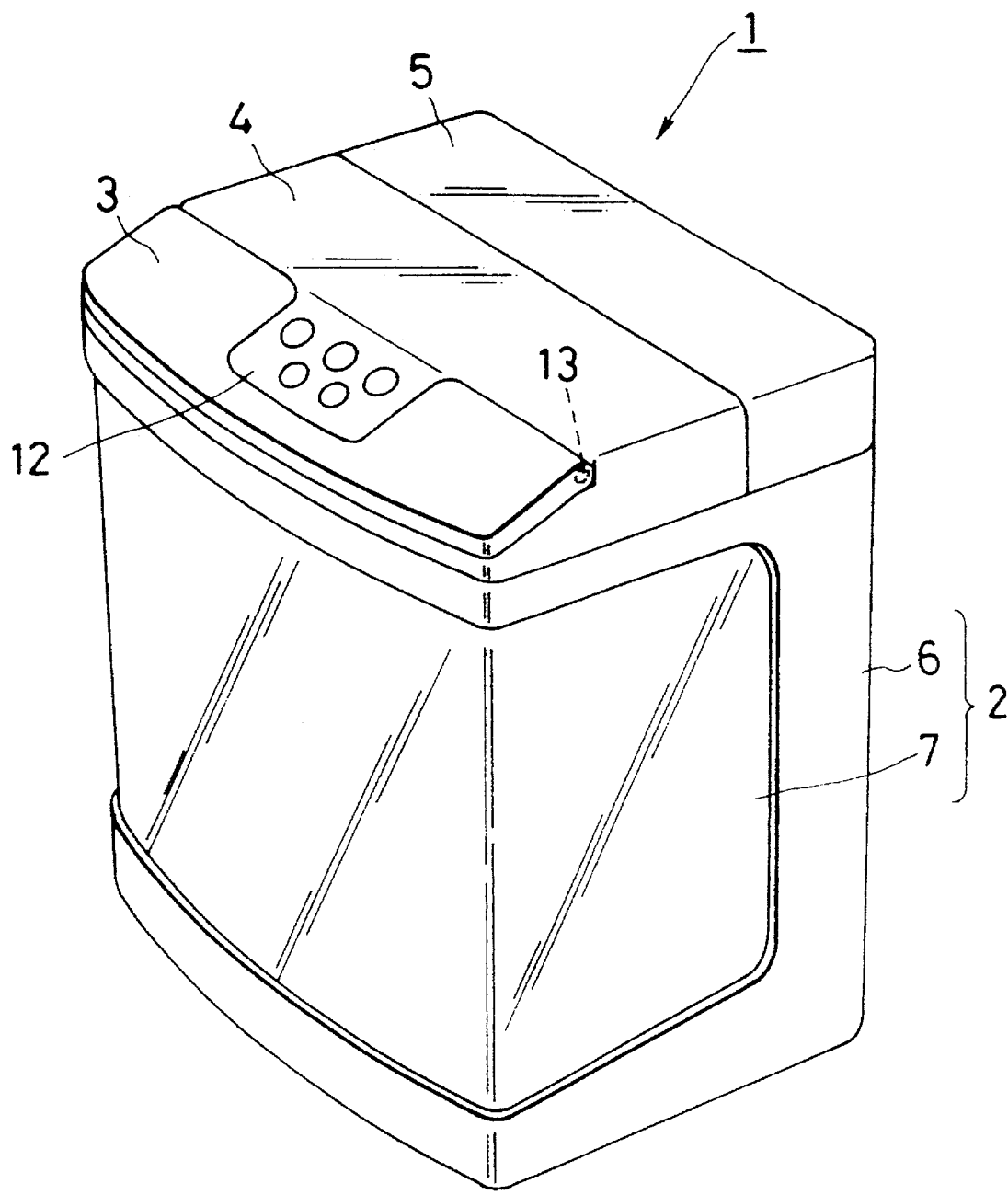
FIG. 1 is a perspective view of an aquarium tank for raising tropical fish etc. and shown one embodiment of an illuminator according to the present invention.

As shown in FIG. 1, an aquarium tank 1 comprises a tank body 2 and a lid comprising a lid member 4 which has an openable and closable front lid 3 and contains an illuminator etc. (not shown) therein, and a cover member 5 in which a filter member, a pump, etc. (not shown) are accommodated. The lid member 4 and the cover member 5 may be made integral.

Figure 2:
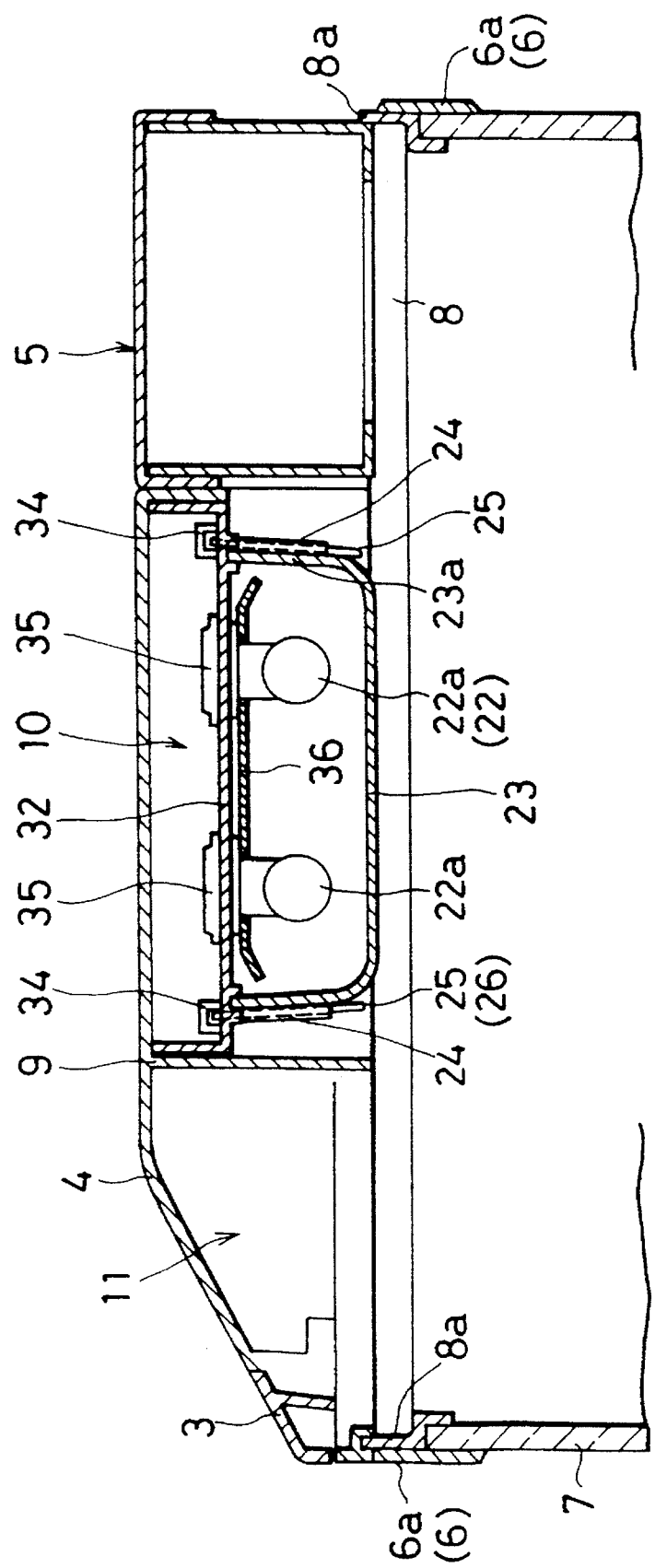
FIG. 2 is a sectioned side view showing the illuminator in the upper portion of the aquarium tank.

The tank body 2 comprises a main frame 6 made of synthetic resin or the like and open on the front, portions of the opposite sides and top, and a transparent frame 7 made of glass, synthetic resin or the like, having a U-shaped sectional profile and mounted in the main frame 6 using adhesive so that the open front and side portions of the main frame 6 are closed watertight manner. As shown in FIG. 2, the upper edge of the transparent frame 7 is clamped between the upper end 6a of the main frame 6 and an abutment 8 fitted on the upper end 6a, with engaging pieces 8a provided on the abutment 8 engaging with the lower edges of the lid member 4 and cover member 5. The lid member 4 is formed of a framework 9 of synthetic resin in the form of a shallow dish. The front portion of the framework 9 has the front lid 3 pivotably attached thereto to allow feeding of tropical fish and the rear portion thereof is utilized as an accommodation portion 11 in which an illuminator 10 etc. are accommodated. The accommodation portion 11 has an extension part which extends forward from the center thereof and at which an operation section 12 including a switch, a timer, etc. (not shown) is formed as shown in FIG. 1. The front lid 3 has a substantially U-shaped notch complementary to the extension part of the lid member 4 and is pivotably attached to the lid member 4 (framework 9) on the opposite sides by means of a hinge device 13.

Figure 3:
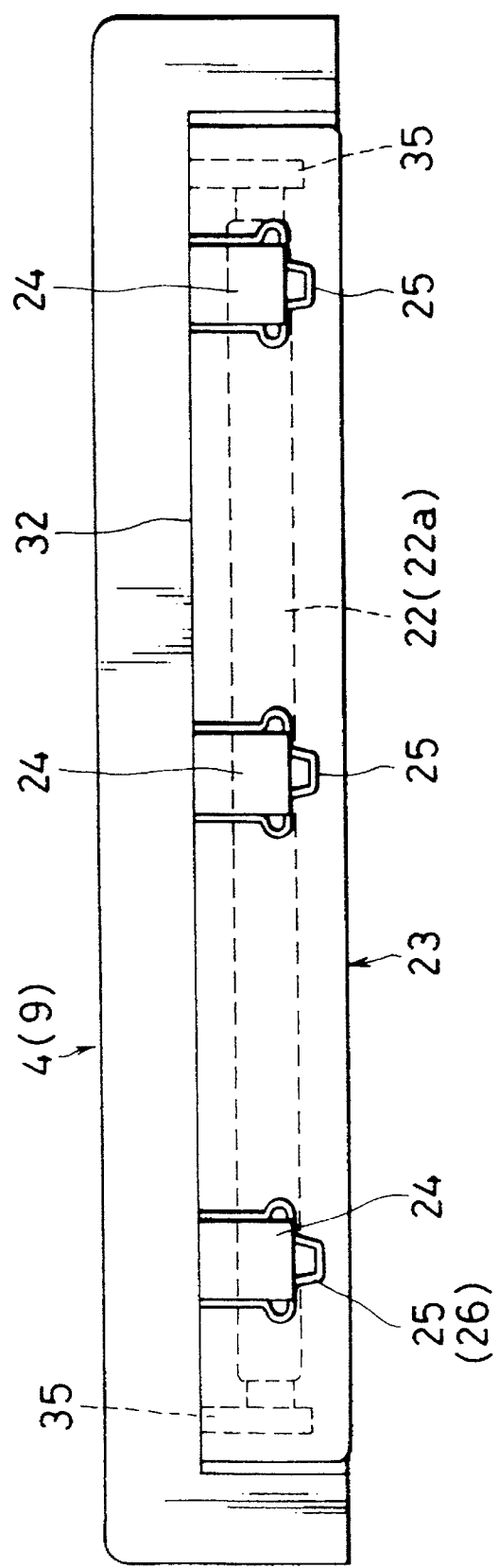
FIG. 3 is an end view showing the illuminator visible when a lid member of the aquarium tank is vertically cut off in its lengthwise direction.
Figure 4:
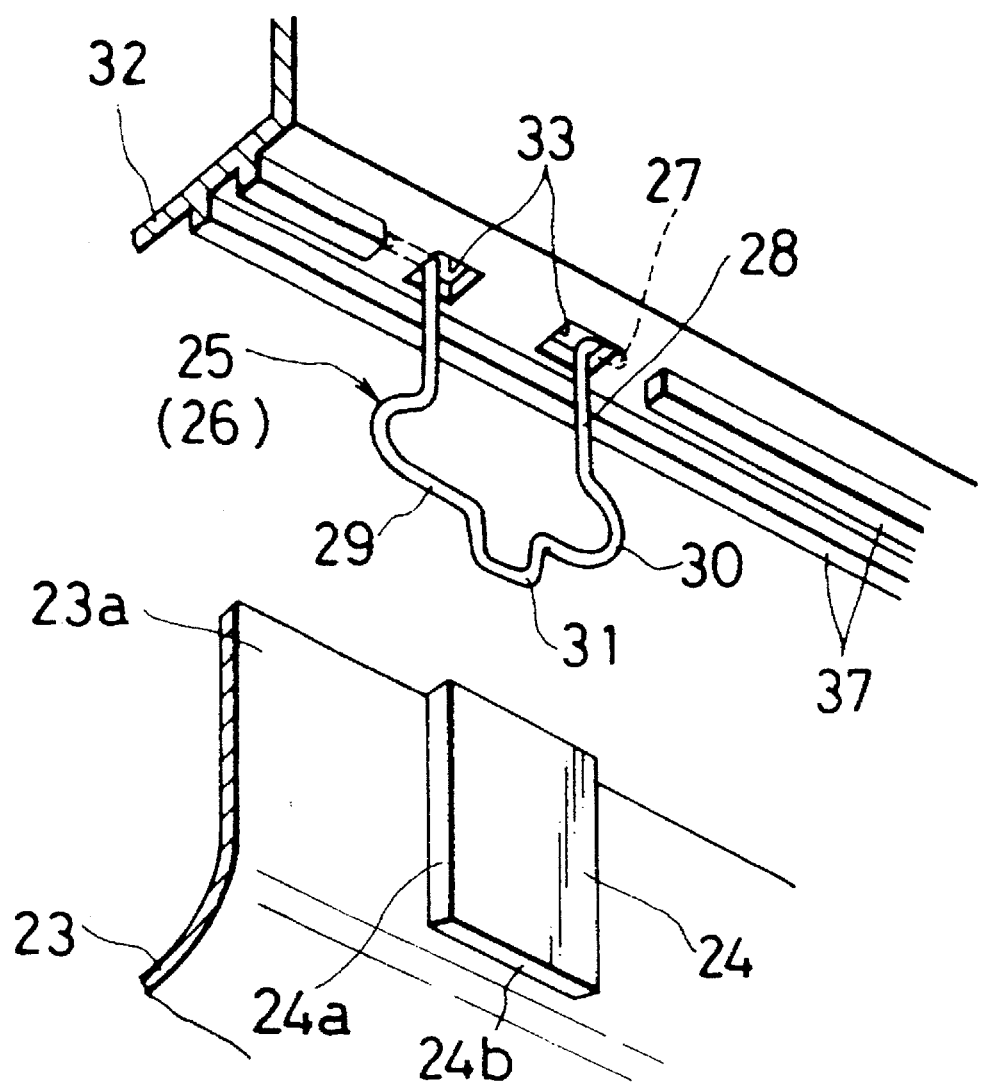
FIG. 4 is a perspective view showing a resilient fastening member and a fastened member of the illuminator.

The illuminator 10 accommodated in the lid member 4 includes a base plate 32, two fluorescent lamps 22a arranged substantially in parallel as a light source 22, and a transparent translucent cover 23 covering and protecting the light source 22. A drive means for the fluorescent lamps 22a is not shown in the drawings, but accommodated in the framework 9 of the lid member 4. The translucent cover 23 has an upper opening, is molded from a transparent synthetic resin in the form of a deep dish, and is provided on its side surface 23a with a plurality of fastened members 24 disposed at suitable positions. As shown in FIG. 3, the fastened members 24 are substantially rectangular in shape and each have opposite side surfaces 24a which are substantially in parallel (FIG. 4) and a bottom surface 24b inclined slightly toward the side surface 23a of the translucent cover 23 (FIG. 5).

Figure 6:
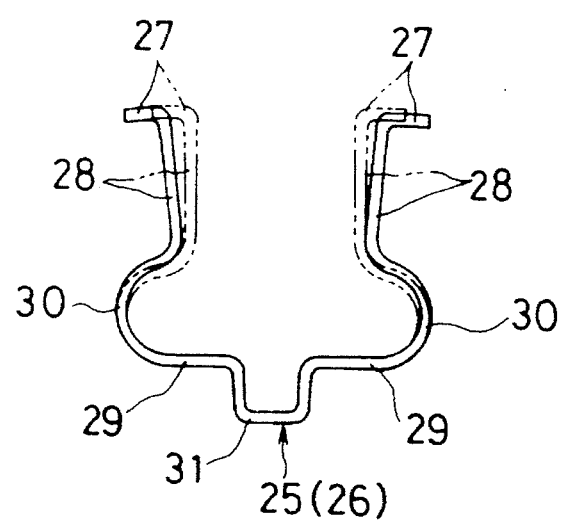
FIG. 6 is a front view showing the resilient fastening member of the illuminator.

The base plate 32 is mounted within the framework 9 of the lid member 4 and provided with a plurality of resilient fastening members 25 corresponding in number to the fastened members 24 and each formed by bending a thin metal rod into a clip 26. As shown in FIG. 6, the clip 26 comprises a pair of arm portions 28 having hooks 27 projecting away from each other, a pair of fastening portions 29, a pair of connecting portions 30 bent outward and each connecting the arm portion 28 and the fastening portion 29, and an operating portion 31 which connects the fastening portions 29 and on which the finger or a tool can be hooked. In the normal state, the pair of arm portions 28 of the clip 26 expand slightly outward as shown by the solid line in FIG. 6.

The base plate 32 is provided with brackets 35 for the fluorescent lamps 22a and a reflector 36 and (is formed therein) with engaging holes 33. The clip 26 is attached to the base plate 32 by flexing the arm portions 28 inward as shown by the phantom line in FIG. 6, passing the hooks 27 of the inwardly flexed arm portions 28 through the engaging holes 33 of the base plate 32 and depriving the arm portions 28 of the flexion, thereby allowing the arm portions 28 to restore to their original positions to bring the hooks 27 into engagement with the edges of the engaging holes 33. The base plate 32 is also provided with stoppers 34 for preventing the hooks 27 from excessively projecting toward the lid member 4 and with channel-forming guide ribs 37 for guiding and positioning the periphery of the translucent cover 23 and preventing waterdrops from entering the translucent cover 23.

Figure 5:
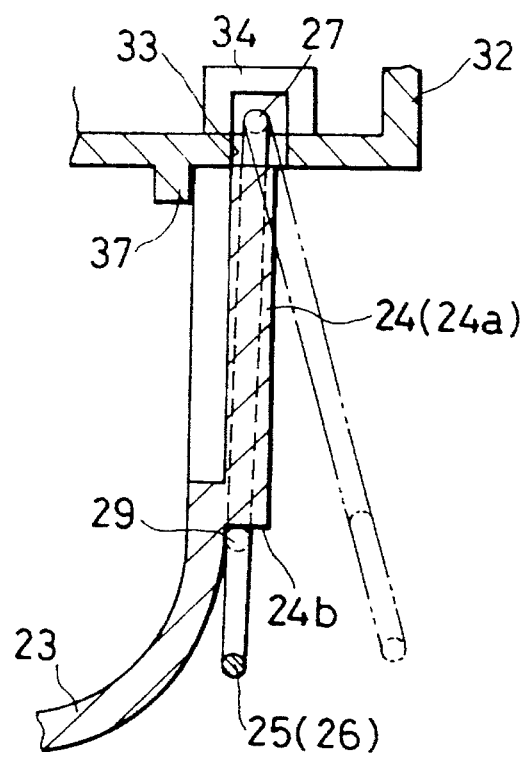
FIG. 5 is a cross section showing the resilient fastening member and the fastened member of the illuminator in their engaged state.

The translucent cover 23 can be easily attached to the base plate 32 by swinging the clips 26 provided on the base plate 32 outward as shown by the phantom line in FIG. 5, positioning the translucent cover 32 utilizing the guide ribs 37, and pushing the clips 26 inward to cause engagement between the fastening portions 29 of the resilient engaging members 25 (clips 26) and the slightly inclined bottom surfaces 24b of the engaged members 24. Since the clips 26 have resiliency, this engagement can be readily carried out. The translucent cover 23 may further be provided on its shorter side edges with flanges (not shown) so as to enhance stable attachment to the base plate 32.

When the translucent cover 23 thus attached is to be detached from the base plate 32 for the purpose of cleaning or replacing the fluorescent lamps 22a, this can also be attained with lease by swinging the clips 26 outwardly utilizing their operating portions 31 and resiliency to disengage the fastening portions 29 of the clips 26 from the bottom surfaces 24b of the engaged members 24.

As has been described in the foregoing, with the illuminator according to the present invention a translucent cover can be readily attached to or detached from a base plate by the engagement or disengagement of fastening members to or from fastened members to facilitate maintenance operation including cleaning of the translucent cover and fluorescent lamps, removal of waterdrops from the translucent cover, replacement of the fluorescent lamps, etc. Thus, the workability is greatly improved.

The present invention has been described with reference to one illustrated embodiment. However, this invention is not limited to this embodiment and may be freely modified within the scope of the appended claims.

Japanese Utility Model Application No. 5-18900 filed Mar. 23, 1993 is hereby incorporated by reference.

What is claimed is:

1. An illuminator for an aquarium tank having a tank body and a lid member mounted on the tank body, the lid member accommodating the illuminator therein, said illuminator comprising:

a base plate;

a light source attached to said base plate;

a translucent cover covering said light source and protecting said light source from water drops, said cover including a plurality of fastened members; and a plurality of resilient fastening members provided on said base and detachably engaging said fastened members, each of said resilient fastening members including a clip formed of a bent, thin metal rod, said clip including a pair of arm portions having hooks hooked on said base plate, a pair of fastening portions, a pair of arm portions, a pair of connecting portions bent outward and each interconnecting one of the arm portions and one of the fastening portions, and an operating portion which is connected to one of the connecting portions and one of the fastening portions.

* * * * *